(12) United States Patent
Ookawa et al.

(10) Patent No.: US 10,596,856 B2
(45) Date of Patent: Mar. 24, 2020

(54) PNEUMATIC TIRE

(71) Applicant: BRIDGESTONE CORPORATION, Tokyo (JP)

(72) Inventors: Naohiro Ookawa, Koshigayoshi (JP); Masayuki Kurebayashi, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 453 days.

(21) Appl. No.: 14/760,508

(22) PCT Filed: Jan. 31, 2014

(86) PCT No.: PCT/JP2014/000531
§ 371 (c)(1),
(2) Date: Jul. 13, 2015

(87) PCT Pub. No.: WO2014/119336
PCT Pub. Date: Aug. 7, 2014

(65) Prior Publication Data
US 2015/0352903 A1    Dec. 10, 2015

(30) Foreign Application Priority Data

Feb. 1, 2013 (JP) .................................. 2013-018734
Jun. 18, 2013 (JP) .................................. 2013-127398

(51) Int. Cl.
*B60C 11/11* (2006.01)
*B60C 11/12* (2006.01)
(Continued)

(52) U.S. Cl.
CPC ................ *B60C 11/11* (2013.01); *B60C 5/00* (2013.01); *B60C 11/0306* (2013.01);
(Continued)

(58) Field of Classification Search
CPC . B60C 11/0306; B60C 11/1236; B60C 11/11; B60C 2011/0346;
(Continued)

(56) References Cited

U.S. PATENT DOCUMENTS 3,104,693 A    9/1963  Bolenbach
4,856,571 A    8/1989  Collette et al.
(Continued)

FOREIGN PATENT DOCUMENTS

EP    2301768 A1    3/2011
EP    2371583 A1    10/2011
(Continued)

OTHER PUBLICATIONS

Machine translation for Japan 2012-051504 (no date).*
(Continued)

*Primary Examiner* — Steven D Maki
(74) *Attorney, Agent, or Firm* — Sughrue Mion, PLLC

(57) ABSTRACT

In a pneumatic tire, blocks 11 each have a block width that is increased from circumferential end portions to a circumferential middle portion of the block 11 in a manner such that widthwise end portions 10 located on both ends in the tread width direction are positioned in a circumferentially intermediate portion of the block 11 and also have the maximum circumferential length that is larger than the maximum width of the block 11, thereby having, in its plan view, a polygonal contour shape that includes end sides 11a located in the circumferential end portions, and circumferential distances a and a1 between a circumferential middle position 11b of each end side 11a of the block 11 and a circumferential middle position 10a of a line L connecting the widthwise end portions 10 of the block 11 are both twice or more of the maximum depth of circumferential grooves.

5 Claims, 5 Drawing Sheets

(51) Int. Cl.
  *B60C 5/00* (2006.01)
  *B60C 11/03* (2006.01)
  *B60C 11/04* (2006.01)

(52) U.S. Cl.
  CPC ........... *B60C 11/0311* (2013.01); *B60C 11/04* (2013.01); *B60C 11/125* (2013.01); *B60C 11/1236* (2013.01); *B60C 11/1263* (2013.01); *B60C 11/1281* (2013.01); *B60C 2011/036* (2013.01); *B60C 2011/0346* (2013.01); *B60C 2011/0353* (2013.01); *B60C 2011/0355* (2013.01); *B60C 2011/0365* (2013.01); *B60C 2011/1209* (2013.01); *B60C 2200/06* (2013.01)

(58) Field of Classification Search
  CPC ..... B60C 2011/0355; B60C 2011/0365; B60C 2011/0353; B60C 11/125; B60C 11/1263; B60C 11/1281
  See application file for complete search history.

(56) References Cited

U.S. PATENT DOCUMENTS

| | | | |
|---|---|---|---|
| 2002/0124922 A1 | 9/2002 | Carra et al. | |
| 2003/0173010 A1* | 9/2003 | Ammon | B60C 11/00 152/209.4 |
| 2011/0108176 A1* | 5/2011 | Nakamizo | B60C 11/0306 152/209.18 |
| 2011/0139324 A1 | 6/2011 | Kuwahara et al. | |
| 2011/0232815 A1* | 9/2011 | Nakamizo | B60C 11/0306 152/209.18 |
| 2012/0216931 A1 | 8/2012 | Shiono | |

FOREIGN PATENT DOCUMENTS

| | | | |
|---|---|---|---|
| JP | 2004-98854 A | | 4/2004 |
| JP | 2006-111091 A | * | 4/2006 |
| JP | 2006-111091 A | | 4/2006 |
| JP | 2006-192959 A | | 7/2006 |
| JP | 2007-153275 A | * | 6/2007 |
| JP | 2009-196527 A | | 9/2009 |
| JP | 2009-234362 A | | 10/2009 |
| JP | 2012-051504 A | * | 3/2012 |
| JP | 2012-51504 A | | 3/2012 |
| WO | 2008/146581 A1 | | 12/2008 |
| WO | 2010/021288 A1 | | 2/2010 |
| WO | 2011/055681 A1 | | 5/2011 |

OTHER PUBLICATIONS

Machine translation for Japan 2007-153275 (no date).*
Machine translation for Japan 2006-111091 (Year: 2018).*
Japanese Office Action for JP 2013-018734 dated May 7, 2014.
Japanese Office Action for JP 2013-018734 dated Sep. 30, 2014.
International Search Report for PCT/JP2014/000531 dated May 13, 2014.

* cited by examiner

PNEUMATIC TIRE

CROSS REFERENCE TO RELATED APPLICATIONS

This application is a National Stage of International Application No. PCT/JP2014/000531 filed Jan. 31, 2014, claiming priority based on Japanese Patent Application Nos. 2013-018734 filed Feb. 1, 2013 and 2013-127398 filed Jun. 18, 2013, the contents of all of which are incorporated herein by reference in their entirety.

TECHNICAL FIELD

The present disclosure relates to a pneumatic tire suited for use in heavy-duty vehicles such as trucks and buses.

BACKGROUND

Conventional tires of this type targeted at improvement of wear resistance include the one disclosed in Patent Literature 1.

To enhance wear resistance by optimizing the shapes and the locations of block land portions, Patent Literature 1 discloses a "tire having plural [a plurality of] rows of block land portions formed by demarcation by providing plural circumferential grooves extending along tire circumferential direction and plural lateral grooves in communication with adjacent two circumferential grooves; in at least two rows of block land portions adjacent to each other with a circumferential groove therebetween, among the rows of block land portions, the respective rows of block land portions are disposed to be offset with respect to each other in the tire circumferential direction; the extending direction of the groove portion between the block land portions adjacent to each other in the tire widthwise direction is inclined with respect to the tire widthwise direction and tire circumferential direction; and a distance between the block land portions adjacent to each other in the tire widthwise direction is shorter than a distance between the block land portions adjacent to each other in the tire circumferential direction."

The tire with the above structure is capable of efficiently generating significant driving force exerted per unit area at a stepping-in time by reaction between the block land portions, by utilizing the features that the groove portion between the block land portions adjacent to each other in the tire widthwise direction is inclined with respect to the tire circumferential direction and the tire widthwise direction and that the distance between the block land portions is relatively small, while reducing expansion components of rubber due to contact of two block land portions that are adjacent in the tire circumferential direction. As a result, the tangent of change in shear force in the circumferential direction in a period from the stepping-in time to a kicking-out time is reduced, whereby sliding wear may be effectively reduced.

CITATION LIST

Patent Literature

PL1: WO2008146851(A1)

SUMMARY

Technical Problem

However, the tire with the above structure still inevitably faces the problem of lack of wear resistance and a shortened wear life due to a decrease in an absolute value of a tolerable volume of wear, when the maximum depth of circumferential grooves equipped with wear indicators is controlled to be as relatively shallow as the lower limit specified by the Engineering Design Information (EDI), which is the compliance guideline of the Japan Automobile Tire Manufacturers' Association (JATMA), to reduce the volume of tread rubber relatively so as to reduce the direct material cost and relatively improve rigidity of the blocks defined on the tread surface. This is evident in particular under conditions of use in which inputs to the tire are increased.

The present disclosure focuses on the above problem and provides improvements over the tire disclosed in Patent Literature 1, and the present disclosure is to provide a pneumatic tire that is imparted with excellent driving performance and wet performance due to a sufficient number or sufficient lengths of peripheries of blocks maintained to extend in the tire width direction within a contact patch of the tread surface of the tire and, at the same time, is also capable, with its effectively improved wear resistance, of exhibiting a long wear life even under the conditions of use in which inputs to the tire are increased by a roaring start, sudden acceleration, or the like under the effect of loads.

Solution to Problem

According to the disclosed aspect, provided is a pneumatic tire, an example of which is a radial tire, including a tread surface provided with two or more circumferential grooves, width direction grooves each opening to two of the two or more circumferential grooves that are adjacent in a tread width direction, and a plurality of block rows including a plurality of blocks defined by the two or more circumferential grooves and the width direction grooves. Each of the two or more circumferential grooves extends to be inclined with respect to a tread circumferential direction and bent in several locations and also extends continuously in the tread circumferential direction in, for example, a zigzag, a saw tooth wave, a wave, or a crank shape, wherein respective blocks included in at least two of the plurality of block rows that are adjacent in the tread width direction with one of the two or more circumferential grooves sandwiched therebetween are arranged to be offset relative to each other, i.e., with a "topological difference", in the tread circumferential direction, and the one of the two or more circumferential grooves sandwiched therebetween is smaller in groove width than a width direction groove extending in, for example, a straight line shape between any two of the respective blocks that are adjacent in the tread circumferential direction, the respective blocks each have a block width that is gradually increased from circumferential end portions of the block to a circumferential middle portion of the block in a manner such that widthwise end portions of the block located on both ends in the tread width direction are positioned in a circumferentially intermediate portion of the block, and the respective blocks each also have a maximum circumferential length that is larger than the maximum width of the block, thereby having, in a plan view thereof, a pentagonal or a higher order polygonal contour shape that includes end sides located in the circumferential end portions, and circumferential distances between a circumferential middle position of each of the end sides of the block and a circumferential middle position of a line connecting the widthwise end portions of the block are both twice or more a maximum depth of the two or more circumferential grooves.

Herein, a "tread surface" represents a portion of the tire that contacts a flat plate when the tire is mounted with an applicable rim, inflated with a specified air pressure, and then placed upright on the flat plate at a standstill with a load corresponding to a specified mass exerted thereon. The phrase "blocks are arranged to be offset relative to each other in the tread circumferential direction" means that, for two blocks that are adjacent in the tread width direction each having an arrangement pitch with a starting point and an end point in the tread circumferential direction, a position of at least one of the starting point and the end point of one block is offset from a position of the at least one of the starting point and the end point of the other block in the tread circumferential direction to prevent at least one of circumferential ends of one block from being aligned with that of the other block in the tread width direction.

Herein, an "application rim" represents a rim prescribed for each tire size by an industrial standard which is valid in an area where the tire is manufactured and used. Examples of the industrial standard include: the Japan Automobile Tire Manufacturers Association Inc. (JATMA) YEAR BOOK in Japan; the European Tire and Rim Technical Organization (ETRTO) STANDARD MANUAL in Europe; the Tire and Rim Association Inc. (TRA) YEAR BOOK in the United States and the like.

A "specified air pressure" represents an inflated air pressure (maximum air pressure) specified for each tire size by the standards such as the JATMA in correspondence with the maximum load capacity of the tire, and a "specified mass" represents the maximum mass that may be applied to the tire according to the above standars, namely, the maximum load capacity.

As used herein, air may be replaced by a nitrogen gas or other inert gases.

Hereinafter, the state "when the tire is mounted with an applicable rim, inflated with a specified air pressure, and then placed upright on the flat plate at a standstill with a load corresponding to a specified mass exerted thereon" is referred to as a "maximum load condition." Similarly, the state "when the tire is mounted with an applicable rim, inflated with a specified air pressure, and then placed upright on the flat plate at a standstill with a load corresponding to 80% of a specified mass exerted thereon" is referred to as an "80% load condition."

Herein, the "maximum depth of the (two or more) circumferential grooves" represents the maximum depth of one or more of the circumferential grooves equipped with wear indicators, and the maximum depth herein is set to be close to the lower limit of the groove depth specified by the EDI, which is the compliance guideline of the JATMA, as described above.

An "end side" represents one of a plurality of sides of the block having, in a plan view of the tread pattern, a pentagonal or a higher order polygonal shape that is located on each of both end sides in the tread circumferential direction, that extends to be inclined with respect to the tread circumferential direction, and that faces a width direction groove located adjacent to the block. A "widthwise end portion" of the block represents, in more detail, a corner portion when the corner portion is present in the outermost end position of the block in the tread width direction as a vertex at an intersection between two of the plurality of sides of the block or alternatively, represents a middle point of one of the plurality of sides of the block that extends along the tread circumferential direction when such a side is present in the outermost end position of the block in the tread width direction.

Advantageous Effects

In the pneumatic tire according to the disclosed aspect, the respective blocks included in the at least two block rows that are adjacent in the tread width direction, each block having a pentagonal or a higher order polygonal contour shape in the plan view, are arranged to be offset relative to each other in the tread circumferential direction, and moreover, the circumferential groove extending in, for example, a zigzag shape between the at least two block rows is smaller in groove width than a width direction groove extending between any two of the respective blocks that are adjacent in the tread circumferential direction. Accordingly, similarly to the tire in Patent Literature 1, even when being mounted with an applicable rim, inflated with a specified air pressure, and then placed upright on the flat plate at a standstill with a load corresponding to a specified mass exerted thereon and when being applied with large inputs by a roaring start, sudden acceleration, or the like, the pneumatic tire according to the disclosed aspect is capable of preventing the blocks from undergoing expansion and deformation by bringing adjacent two blocks into mutual contact in response to collapse and deformation of the circumferential grooves with the small widths within the contact patch under the effect of the large inputs to the tire and, at the same time, is also capable of maintaining wear resistance of the blocks by reducing slippage of the blocks with respect to the contact patch.

At this time, groove walls of the width direction grooves do not come into mutual contact in this situation, and desired draining performance of the width direction grooves is maintained satisfactorily even under the effect of the large inputs to the tire.

Furthermore, in the pneumatic tire according to the disclosed aspect, each block has a block width that is gradually increased from the circumferential end portions of the block to the circumferential middle portion of the block, and the circumferential distances between the circumferential middle position of each end side of the block and the circumferential middle position of the line connecting the widthwise end portions of the block that are located on both the ends of the block in the tread width direction are twice or more the maximum depth of the circumferential grooves. Accordingly, rigidity of the block itself in the tread circumferential direction is improved, and therefore, slippage of the block with respect to the contact patch is further reduced. As a result, wear resistance of the block is further improved, which in turn results in improved wear resistance of the tread.

In other words, by controlling the aforementioned circumferential distance to be twice or more the maximum depth of the circumferential grooves, the maximum depth of the circumferential grooves becomes relatively shallow compared with prior art, and by thus increasing rigidity of the block, the magnitude of slippage and deformation is reduced. Despite the general fact that tires with the increased rigidity and the reduced magnitude of slippage and deformation of the blocks still inevitably suffer from short wear lives in the blocks and eventually, the tread land portions, the pneumatic tire according to the disclosed aspect is capable of further improving rigidity of the blocks and effectively preventing the problem of a short wear life in the tread land portions due to the increased volume of the tread rubber used in each block, by securing the long block length along the tread circumferential direction.

On the other hand, by appropriately selecting the length of each block, edge components extending in the tread width direction are also secured satisfactorily even during empty driving of the vehicle in which the contact patch area of the tread surface of the tire is decreased in the presence of variations in pitch, and the tire is imparted with excellent driving performance and wet performance.

In this respect, when the circumferential distances measured from one end side and from the other end side of the block are differentiated from each other, and when the block has a length between the circumferential middle positions of the one end side and of the other end side (i.e., from the circumferential middle position of the one end side to the circumferential middle position of the other end side) that is 2.5 or less times the shorter one of the two circumferential distances different from each other, shearing deformation of the block is reduced, and wear resistance of the tread is improved more effectively, even under the conditions of use in which inputs to the tire are increased. A "length of the block" is measured in a direction that is parallel with the tread circumferential direction.

In detail, when the length of the block is more than 2.5 times the shorter one of the two circumferential distances, there is a risk that wear resistance might not be improved as desired under the conditions of use in which inputs to the tire are increased, and moreover, there is no denying that driving performance and wet performance are decreased because edge components extending in the tread width direction within the contact patch of the tread surface are excessively decreased during empty driving of the vehicle. Additionally, when the two circumferential distances are different from each other, the length of the block will be larger than twice or more the shorter one of the circumferential distances.

When each circumferential distance is 2.5 or less times the maximum depth of the circumferential grooves, again, shearing deformation of the block is reduced, and wear resistance of the tread is improved more effectively, even under the conditions of use in which inputs to the tire are increased.

That is to say, when each circumferential distance exceeds 2.5 times the maximum depth of the circumferential grooves, there is a risk that wear resistance might not be improved as desired under the conditions of use in which inputs to the tire are increased. Furthermore, when each circumferential distance exceeds 3 times, there is possibly no denying that driving performance and wet performance are decreased because edge components extending in the tread width direction within the contact patch of the tread surface during empty driving of the vehicle are excessively decreased.

When the respective blocks included in the at least two of the plurality of block rows that are adjacent in the tread width direction are each provided with at least one sipe extending in the tread width direction to open to two circumferential grooves that are adjacent in the tread width direction, the sipe serves to divide the block and reduces a peak value of wear energy at the trailing time, thereby further improving wear resistance of the tread land portions. Furthermore, according to edges of the sipe, wet performance and driving and braking performance are also improved.

Herein, a "sipe" represents a groove that is narrow enough to allow wall surfaces of the sipe to closely contact with each other within the contact patch regardless of whether during empty driving or loaded driving of the vehicle and that may extend in a straight line, a curved line, a stepped, a zigzag, or other shapes.

When such a sipe opens to the two circumferential grooves in the circumferential middle portion of the block, there are no variations in rigidity of both areas into which the block is divided by the sipe. This prevents partial wear associated with uneven rigidity in the block. Herein, a "circumferential middle portion of the block" represents a portion of the block that extends within the range of 25% of the circumferential length of the entire block from the circumferential center position of the block.

When the sipe opens to the two circumferential grooves in the widthwise end portions of the block, stress concentration on the widthwise end portions, which tend to have small rigidity, is alleviated, thereby preventing uneven wear.

Meanwhile, in cases where the sipe, which is provided in each block and opens to the two circumferential grooves that are adjacent to the block, has end positions each formed with a notch that is defined by a curved surface which is convex to an outer side of the block and that is seamlessly connected to a wall surface of the sipe, even when the tire is placed under torque in the direction of rotation and the wall of the sipe is deformed toward an opening direction of the sipe, stress concentration on the bottom of the sipe at the end positions of the sipe is prevented, and accordingly, the bottom of the sipe is protected against cracks effectively.

In this regard, by providing the sipe, which extends across the block, with one or more bent portions which may include curved portions, inputs from different directions to portions of the block defined by the sipe may be effectively supported by each portion of the block cooperatively at the time of rotation of the tire under load. This prevents unintentional deformation of each portion of the block and eventually, also prevents decreases in wear resistance performance, steering stability, or the like effectively.

Furthermore, by controlling the depth of the notch to be smaller in one end position of the sipe that is located closer to the tire equatorial plane than in the other end position of the sipe that is located away from the tire equatorial plane, the degree of opening of the opposing walls of the sipe may be reduced in the vicinity of the tire equatorial plane where contact pressures on the tread surface are increased. This protects the bottom of the sipe against cracks even more effectively.

Meanwhile, when the tread includes at least two adjacent block rows in a tread central zone, the blocks are supported by one another at the time of rotation of the tire under load. As a result, shearing rigidity in the circumferential direction is improved, and moreover, shearing force generated in the blocks due to contact may be controlled to improve wear resistance performance.

In this case, when the groove depth of a circumferential groove extending in a zigzag shape between the at least two block rows is shallower than the groove depth of a circumferential groove extending outward of each of the at least two block rows in the tread width direction and equipped with a wear indicator, and when the groove width of the circumferential groove extending between the of the at least two block rows is set to be in the range from 1 to 3.5 mm, the blocks included in the of the at least two block rows are prevented from undergoing deformation by improving rigidity of the blocks, and moreover, rigidity of the blocks may be further improved by letting the blocks support one another by bringing opposing groove walls of the circumferential groove extending between the at least two block rows into contact with each other within the contact patch.

These result in further improvements in wear resistance performance, steering stability, or the like of the block rows.

Furthermore, when the width of a center block row, the width of a second block row, and the width of a shoulder block row satisfy the following relation the width of the center block row:the width of the second block row:the width of the shoulder block row=100:(42 to 49):(55 to 65), wear resistance performance and steering stability of the tread portion are improved.

DETAILED DESCRIPTION

Figure 1:
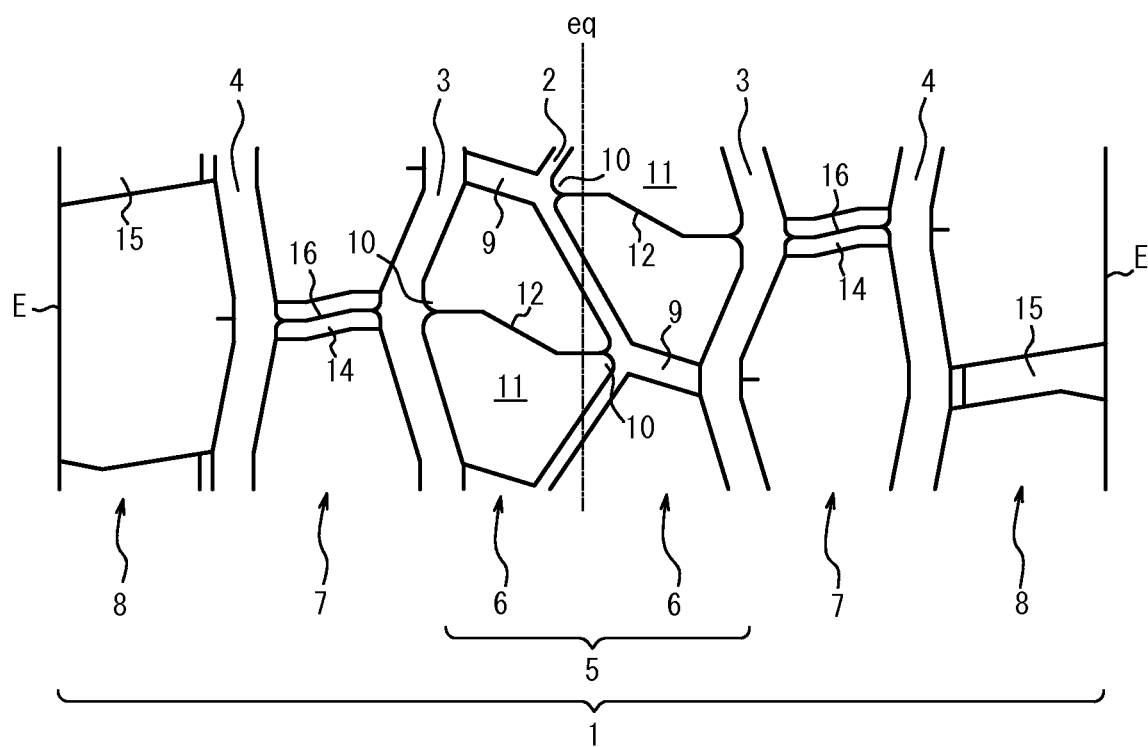
FIG. 1 is a partial development plan view of a tread pattern illustrative of an embodiment.

The following describes an embodiment of the present disclosure with reference to the drawings. As illustrated in FIG. 1, a tread surface 1 is provided with five circumferential grooves 2, 3, and 4 each extending continuously in the tread circumferential direction and formed in a zigzag shape. The zigzag amplitudes of the circumferential grooves 2, 3, and 4 are gradually reduced from the tire equatorial plane eq to the outer side in the tread width direction. Thus, the zigzag amplitude of the pair of circumferential direction grooves 4 formed in the outermost sides in the tread width direction is smaller than the zigzag amplitudes of three circumferential direction grooves 2 and 3 formed in a tread central zone 5. The circumferential direction grooves provided in the tread surface may have any shape that extends to be inclined with respect to the tread circumferential direction and bent in several locations, and the circumferential direction grooves may have other shapes, such as a saw tooth wave, a wave, or a crank shape which are not illustrated, than the illustrated zigzag shape extending to be inclined with respect to each of the tread width direction and the tread circumferential direction.

In the illustrated pneumatic tire, a total of six land portion rows composed of center land portion rows 6, second land portion rows 7, and shoulder land portion rows 8 are defined between the circumferential grooves 2 and 3, between the circumferential grooves 3 and 4, and between the circumferential grooves 4 and tread side edges E, respectively.

Additionally, an internal reinforcement structure or the like of the tire may be substantially the same as those of general radial tires, and illustration thereof is omitted here.

Furthermore, between the three circumferential grooves 2 and 3 in the central zone 5 in the present embodiment, width direction grooves 9 are each formed to open to two adjacent circumferential grooves 2 and 3, thereby allowing each center land portion row 6 to form the center block row including a plurality of polygonal blocks 11 each having a pentagonal or a higher order polygonal contour shape in the plan view. Each block 11 includes a pair of widthwise end portions 10 that is located on both ends of the block in the tread width direction.

Herein, the pair of widthwise end portions 10 is preferably located within the range of 50% of the circumferential length of the entire block from a circumferential middle portion of the block 11, i.e., from the circumferential center position of the block 11. This allows the block width of the block 11 measured along the tread width direction to be gradually increased from circumferential end portions to the circumferential middle portion of the block 11.

Meanwhile, although the figure illustrates the two center block rows 6 formed between the three circumferential grooves 2 and 3 in the tread central zone 5, two or more center block rows 6 may be formed in the tread central zone 5.

When two or more center block rows 6 are formed in the tread central zone 5, a circumferential groove (e.g., the circumferential groove 2 in the figure) extending in a zigzag shape in the tread circumferential direction between two block rows 6 that are adjacent in the tread width direction preferably has a groove depth that is shallower than the maximum depth of the circumferential grooves (e.g., the circumferential grooves 3 in the figure) extending outward of each block row 6 in the tread width direction and equipped with wear indicators, and the circumferential groove 2 extending between the block rows 6 also preferably has a groove width, for example, in the range from 1 to 3.5 mm, that is smaller than that of each circumferential groove 3. A "groove depth" represents a length between an open end of the groove at a surface position of the block and a bottom of the groove measured along the tire radial direction in the state where the tire has been assembled with an application rim and inflated with a specified air pressure with a load corresponding to a specified mass exerted thereon (i.e., under a maximum load condition). A "groove width" represents a length of the groove measured under the same condition at a surface position of the block on the periphery of the groove along a direction perpendicular to the direction in which the groove extends.

In the present embodiment, as illustrated in the figure and described earlier, the circumferential grooves 2 and 3 have different zigzag amplitudes and also have different inclination angles with respect to the tire equatorial plane eq in the respective linear portions.

Since being formed in such a zigzag shape, the circumferential groove 2 extending between the two center block rows 6 and 6 that are adjacent in the tread width direction is inclined with respect to each of the tread width direction and the tread circumferential direction, and every two blocks 11 that are included in the center block rows 6 and 6 adjacent in the tread width direction with the circumferential groove 2 sandwiched therebetween and that are adjacent in the tread width direction are arranged to be offset relative to each other in the tread circumferential direction.

Furthermore, in the center block rows 6, 6, the circumferential groove 2 is smaller in groove width than a width direction groove 9 extending between two blocks 11 that are adjacent in the tread circumferential direction, and each block 11 has the maximum circumferential length along the tread circumferential direction that is larger than the maximum width of the block along the tread width direction. The width direction groove 9 preferably has a groove width that prevents the width direction groove 9 from contacting a groove wall of a land portion (e.g., a block 11) facing the width direction groove 9 across the circumferential groove 2 at the time of ground contact.

Figure 2:
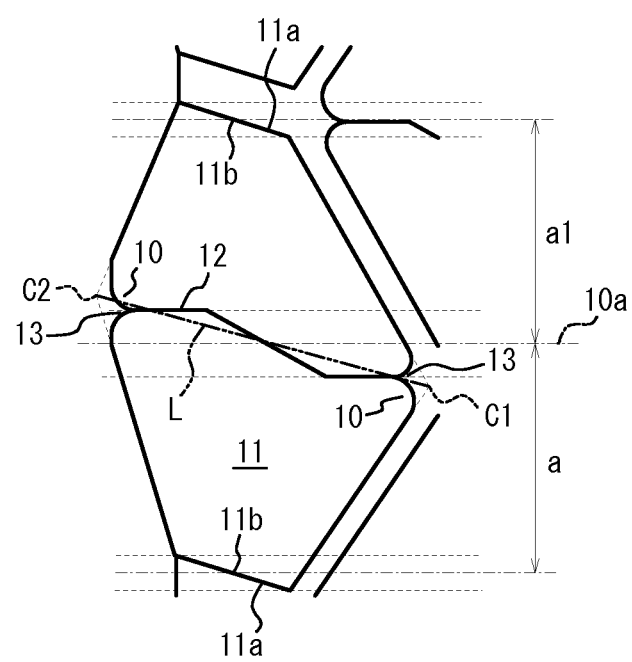
FIG. 2 is an enlarged view of a single block in FIG. 1 for illustrating a dimensional relation.

As illustrated in FIG. 2, such a bock 11 having a pentagonal or a higher order polygonal shape (e.g., a hexagonal shape in the figure) includes end sides 11a located in the circumferential end portions, that is to say, end portions of the block 11 in the tread circumferential direction. The end sides 11a extend in the tread width direction at predetermined inclination angle(s) with respect to the tread circumferential direction and may extend linearly in parallel with each other. Each end side 11a defines a border between the block 11 and a width direction groove 9 that is adjacent to the block 11 in the tread circumferential direction. In other words, each width direction groove 9 is inclined with respect to the tire width direction.

In the present embodiment, circumferential distances a and a1 between the circumferential middle position 11b of each end side 11a of a block 11 included in the center block row 6 and the circumferential middle position 10a of a line connecting the widthwise end portions 10 of the block 11 that are located on both ends of the block 11 in the tread width direction are both twice or more, preferably, from 2 to 2.5 times, of the maximum depth of the circumferential grooves 3 and 4 equipped with wear indicators not illustrated. A "circumferential middle position" of the end side 11a or the line represents a middle position in the tread circumferential direction between endpoints of the end side 11a or the line.

With the circumferential distances a and a1 that are twice or more the maximum depth of the circumferential grooves 3 that are adjacent to and located outward in the tread width direction than, in particular, the two intended center block rows 6 and 6, and based on each circumferential grooves 3 having a relatively shallow groove depth, the tire illustrated in FIG. 1 is capable of improving rigidity of the blocks 11 included in the center block rows 6 and 6 and thereby capable of significantly improving wear resistance of the tread.

In the illustrated embodiment, the circumferential distance a1 measured from one end side 11a (which is located on an upper side in FIG. 2) of the block 11 is equal to the circumferential distance a measured from the other end side 11a (which is located on a lower side in FIG. 2) of the block 11. However, although not illustrated in the present disclosure, the circumferential distance measured from one end side and the circumferential distance measured from the other end side may also be differentiated according to positions in which the pair of widthwise end portions 10 are formed. In this case, the length of the block between the circumferential middle position of one end side and the circumferential middle position of the other end side is set to be 2.5 or less times, preferably, from 2 to 2.5 times, the shorter one of the two circumferential distances different from each other.

In this regard, attention is paid to the shorter one of the two circumferential distances in order to eliminate the risk that the shorter circumferential distance will be less than twice the maximum depth of the circumferential grooves.

Figure 3A:
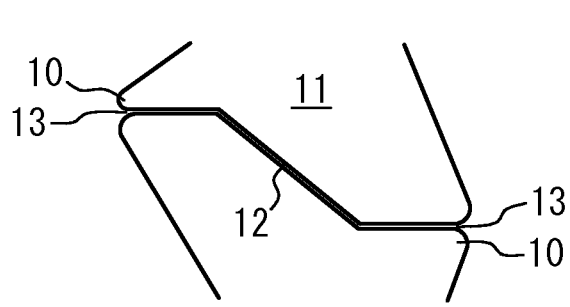
FIG. 3 is an enlarged view illustrative of a notch that may be formed in end positions of each sipe.

Furthermore, in the illustrated tread pattern, the respective polygonal blocks 11 included in the center block rows 6 and 6 are each provided with a sipe 12 that extends across the block 11 and that opens to the circumferential grooves 2 and 3 at the position of the corresponding pair of widthwise end portions 10. The sipe 12 may include one or more bent portions, and as illustrated in enlargement in FIGS. 3A and 3B, the sipe 12 has end positions each formed with a notch 13 that is defined by curved surfaces which are convex to the outer side of the block 11 and that is seamlessly connected to wall surfaces of the sipe.

Accordingly, each sipe 12 herein substantially opens to the circumferential grooves 2 and 3 through the notches 13.

Figure 3B:
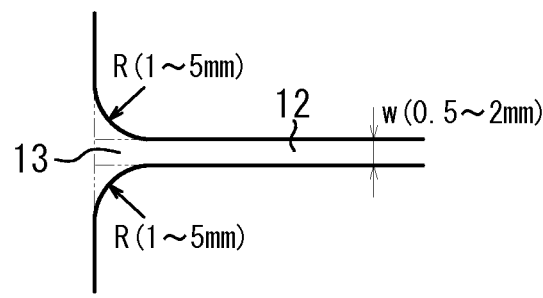
Figure 3C:
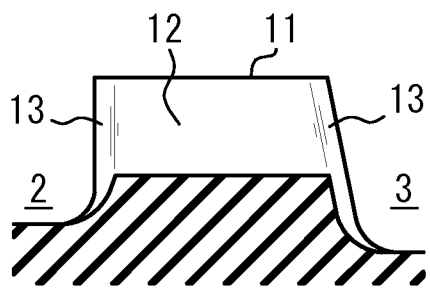

In the present embodiment, as illustrated in FIG. 3C, the depth of the notch 13 formed in the end position of each sipe is preferably controlled to be smaller in one end position of the sipe that is located closer to the tire equatorial plane eq than in the other end position of the sipe that is located away from the tire equatorial plane eq. In the illustrated example, the depth of the notch 13 is smaller in one end position of the sipe that is located near the zigzag shaped circumferential groove 2 than in the other end of the sipe that is located near the circumferential groove 3.

Figure 8:
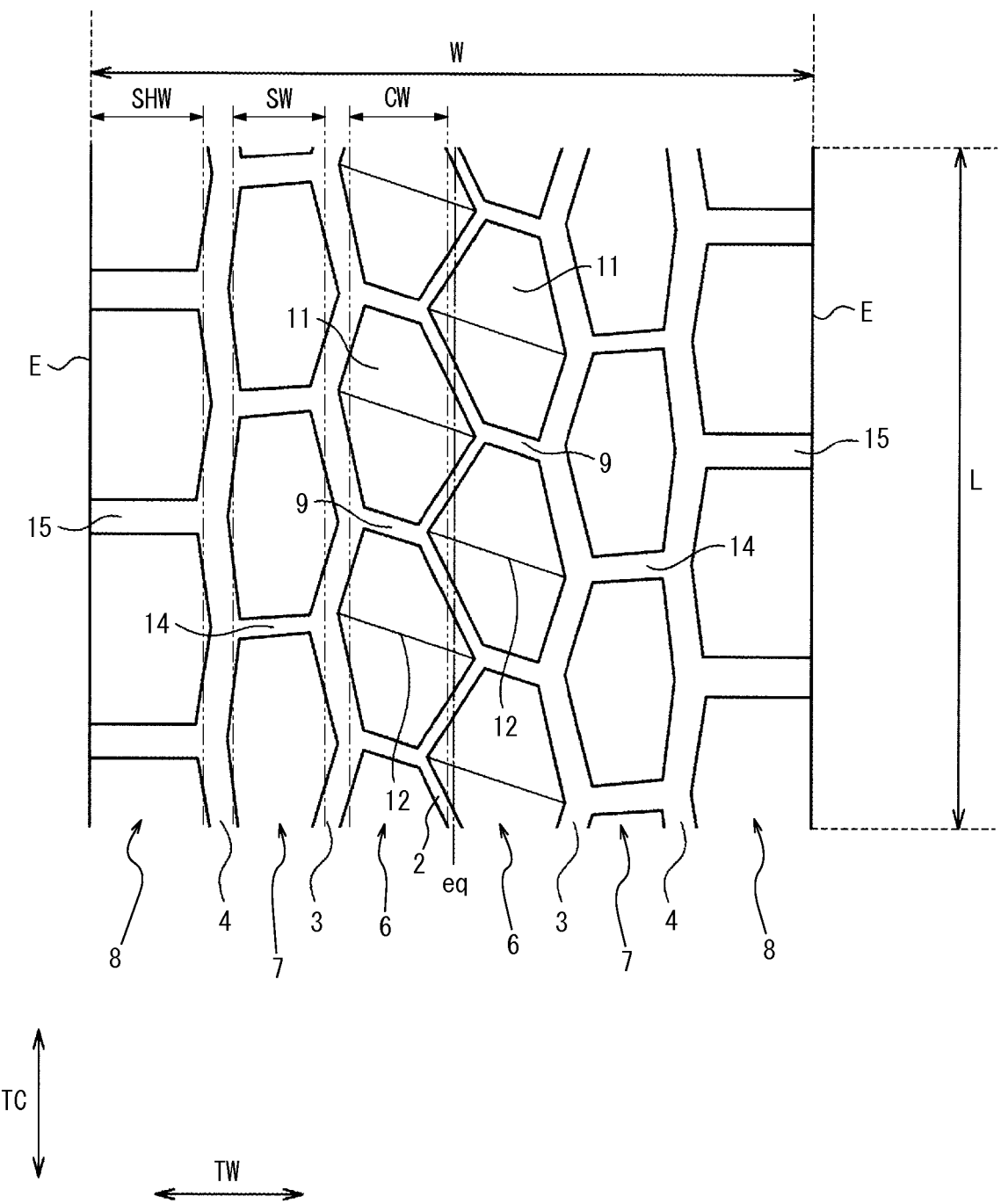
FIG. 8 illustrates a tread contact patch according to a modified example of the embodiment of FIG. 1.

Additionally, as in FIG. 8 illustrating a tread contact patch according to a modified example of the embodiment of FIG. 1, the respective polygonal blocks 11 included in the center block rows 6 may also be each provided with a sipe 12 that does not include bent portions and that extends linearly along the tire width direction or extends linearly to be inclined with respect to the tire width direction. Furthermore, the notch 13 formed in the opening portion to each circumferential groove of the sipe 12 may be omitted.

In cases where the sipe 12 and the notches 13 as described above are provided, as illustrated in FIG. 2, the circumferential middle position 10a of the line connecting the widthwise end portions 10 refers to the circumferential middle position of a line connecting vertices C1 and C2, which are intersections of extension lines (which are represented by broken lines in the figure) of two sides of the block 11 located on both sides of the notch 13 in each widthwise end portion 10 of the block 11.

Meanwhile, as illustrated in FIG. 3B, the outwardly convex curved surface of the notch 13 defined and formed in the end position of each sipe preferably has a radius of curvature R on the surface of the block 11 that is in the range from 1 to 5 mm, and, as illustrated also in FIG. 3B, the sipe 12 preferably has an opening width w with respect to the surface of the block 11 that is in the range from 0.5 to 2 mm.

Furthermore, the depth of the notch 13 preferably falls within the range of ±3 mm with respect to that of the sipe 12.

The tread pattern with the tread central zone 5 including the center block rows 6 and 6 or the like that include the blocks 11 and that may be arranged to straddle the tire equatorial plane eq as described above may have any structures without any particular limitation in other zones on the tread surface than the tread central zone 5. For example, in addition to the structures described above, the tread pattern illustrated in FIG. 1 includes the second land portion rows 7 each defined between the corresponding zigzag shaped circumferential grooves 3 and 4, and the second land portion row 7 forms a second block row with a lateral groove 14, which is arranged in a constricted portion of the land portion row 7, which extends substantially linearly to open to both the circumferential grooves 3 and 4, and which is smaller in depth than the circumferential grooves 3 and 4. The tread pattern illustrated in FIG. 1 also includes the shoulder land portion rows 8 that each form a shoulder block row with an inclined groove 15, which opens to both the circumferential groove 4 and the tread side edge E. Additionally, any width direction grooves defining blocks included in the second block rows 7 are referred to as lateral grooves 14, and that any width direction grooves defining blocks included in the shoulder block rows 8 are referred to as inclined grooves 15.

In the illustrated example, each lateral groove 14 formed in the second block row 7 is also provided at the bottom of the groove with a sipe 16 extending over the entire length of the lateral groove 14.

The sipe 16 provided at the bottom of the groove is preferably a "flask sipe" having a curved bottom surface in order to protect the bottom of the sipe against cracks.

Moreover, as in FIG. 8 illustrating the tread contact patch according to the modified example of the embodiment of FIG. 1, respective blocks included in the center block rows 6, and in the second block rows 7 and the shoulder block rows 8 preferably have sizes in the tire circumferential direction that are larger than those in the tire width direction in the tread plan view.

As illustrated in FIG. 8, each lateral groove 14 is preferably inclined with respect to the tire width direction. Furthermore, each lateral groove 14 preferably has a groove width that is larger than that of any circumferential groove 2. Each inclined groove 15 may extend substantially in parallel with the tire width direction. Each inclined groove 15 has a groove width that may be larger than those of any width direction groove 9 and any lateral groove 14.

Moreover, as illustrated in FIG. 8, each circumferential groove 3 may have a groove width that is substantially equal to that of any circumferential groove 4. Moreover, the circumferential grooves 2 and 3, the width direction grooves 9, the lateral grooves 14, and the inclined grooves 15 all may have the same groove depth.

According to the pneumatic tire with the structures described above, since the circumferential distances a and a1 are set to be twice or more the maximum depth of the circumferential grooves 3 and 4 in the blocks 11 included, in particular, in the center block rows 6, the maximum depth of the circumferential grooves 3 and 4 is controlled to be a relatively small, and moreover, the large length of each block 11 helps improve rigidity of the block 11. Accordingly, at the time of rotation of the tire under load, the blocks 11 included in the two center block rows 6 and 6 come into abutting contact to be supported by one another by bringing the groove walls of the circumferential groove 2 into mutual contact, and by thus preventing the blocks from being deformed to be, for example, protruded or curved, slippages of the blocks with respect to the contact patch is reduced. As a result, excellent wear resistance is maintained satisfactorily in the blocks and eventually, in the tread, even under conditions of use in which inputs to the tire are increased.

On the other hand, edge components of the blocks that extend in the tread width direction (the edge components being located within the contact patch during empty driving of the vehicle to contribute to improvements in wet performance and driving performance) may be controlled as desired simply by appropriately selecting the length of each block 11 in the tread circumferential direction.

Figure 4:
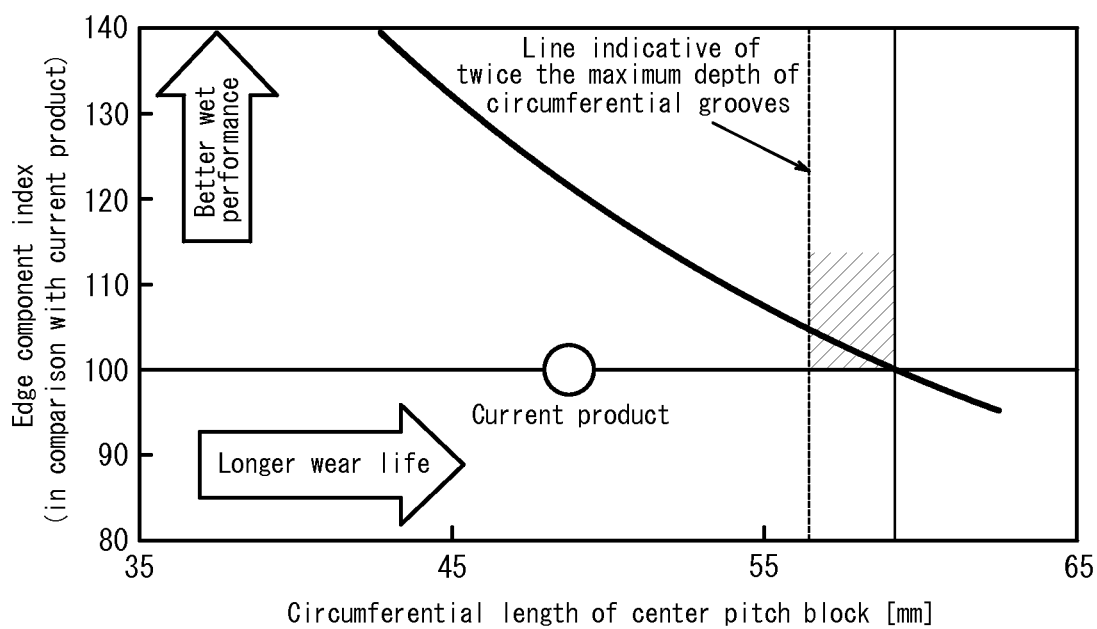
FIG. 4 is a graph illustrating a relation between a block length and an edge component index with a current tire product being indicated as a control.

This is indicated in a graph of FIG. 4 illustrating calculation results for states of changes in the edge components in the tread width direction that may be located within the contact patch during empty driving of the vehicle, with respect to the circumferential length of each block located in the center block rows (hereinafter, referred to as a "center pitch block") at a predetermined pitch, with a current tire product being indicated as a control. As the predetermined pitch, three kinds of pitch variations, namely, a large, the medium, and a small pitch are adopted, As can be understood from FIG. 4, although the longer the circumferential length of the center pitch block becomes, the better wear resistance becomes and the longer the wear life grows, a longer circumferential length results in worse wet performance due to a decrease in the edge components that are located within the contact patch during empty driving of the vehicle.

Accordingly, supposing herein that the same level of wet performance as the current tire product needs to be maintained while wear resistance must be maximized, a certain range in the figure that is shadowed with slanted lines and that is located on the right side of a line indicative of twice the maximum depth of the circumferential grooves represented by a broken line in the figure is the recommended range of the length of the block. It can be seen from the figure that, when the length of the block is less than twice the maximum depth of the circumferential grooves, wear resistance may not be maximized, while wet performance may be improved.

Moreover, according to the example in FIG. 1, since the sipe 12 is provided to extend across each polygonal block 11 included in the center block rows 6 from one widthwise end portion 10 to the other widthwise end portion 10 of the block 11, wear resistance performance and wet performance of the block 11 are further improved.

Besides, in the illustrated tire, since each sipe has the end positions each formed with the notch 13 that is defined by the curved surfaces which are convex to the outer side of the polygonal block 11 and that is seamlessly connected to the wall surfaces of the sipe, even when the opposing walls of the sipe are deformed toward the opening direction at the time of rotation of the tire under load, stress concentration on the bottom of the sipe at the end positions of the sipe is prevented, and accordingly, the bottom of the sipe is protected against cracks effectively.

Figure 9:
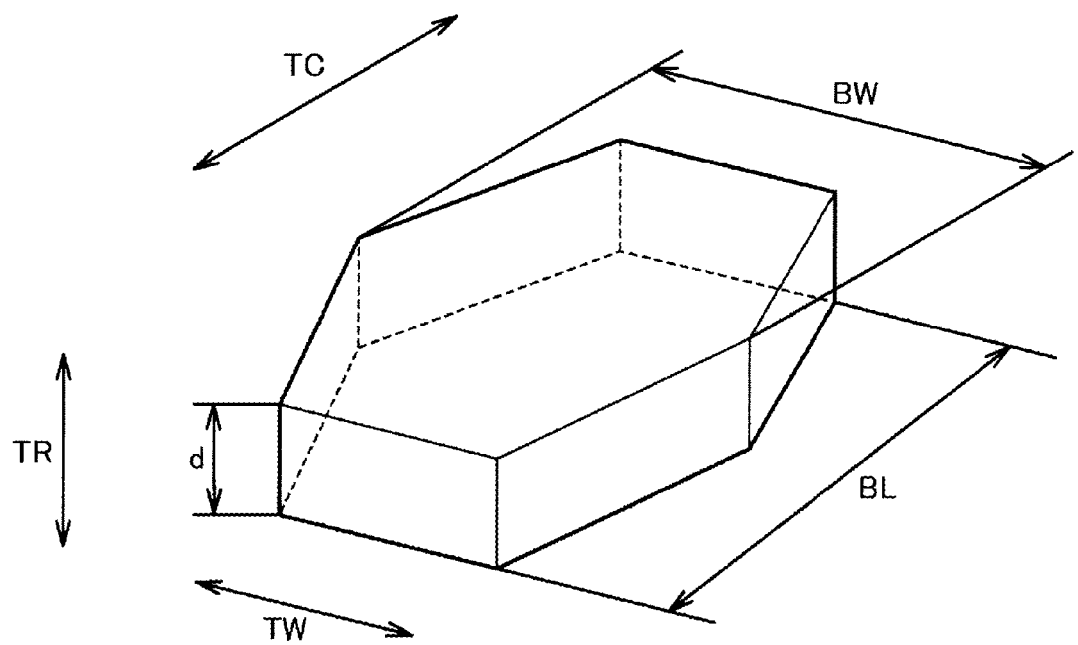
FIG. 9 is a perspective view of a block in FIG. 8.
Figure 10:
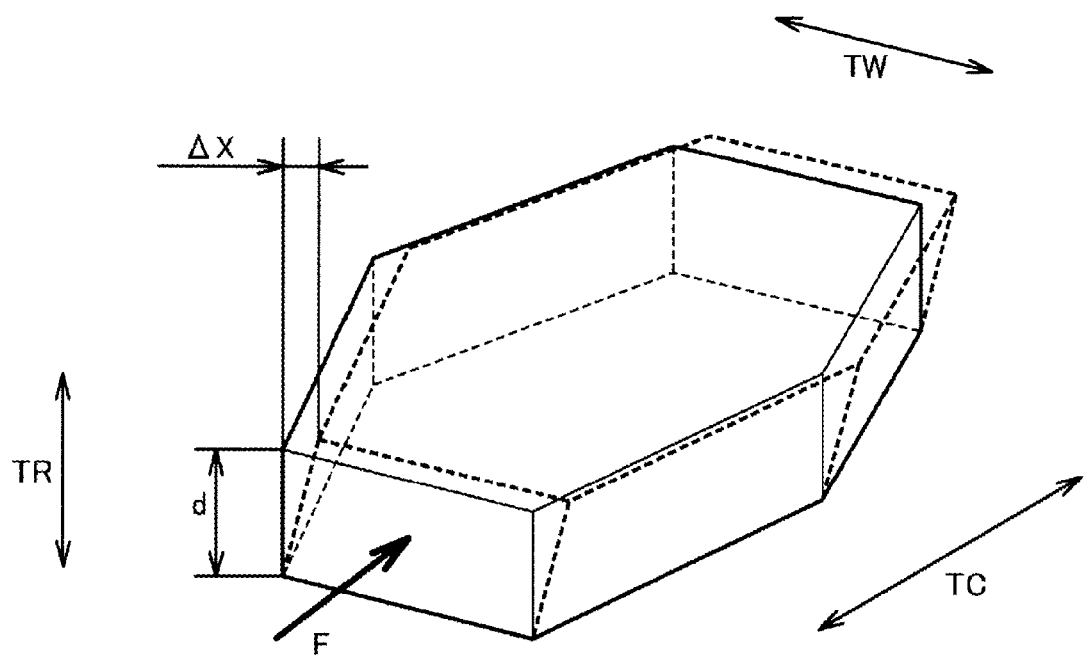
FIG. 10 illustrates a shearing modulus in the circumferential direction.

Now, with reference to FIG. 9, a description is given of each block arranged on the tread surface. FIG. 9 is a perspective view of one of the blocks illustrated in FIG. 8, which illustrates the modified example of the pneumatic tire of FIG. 1. Note that FIG. 9 illustrates the block 11 included in the center block row 6 while omitting the sipe. Although structures described below with reference to FIGS. 8 to 10 are associated with the modified example of the embodiment of FIG. 1, these structures may also be applied to the pneumatic tire illustrated in FIG. 1. The tread surface illustrated in FIG. 8 represents a tread surface under the 80% load condition.

As illustrated in FIG. 9, the block 11 has a width BW as the dimension measured in the tire width direction TW, a length BL as the dimension measured in the tire circumferential direction TC, and a depth d as the dimension measured in the tire radial direction TR. As described earlier, the block 11, in the tread plan view, has a pentagonal or a higher order polygonal shape with the length BL that is larger than the width BW. In the illustrated embodiment, each block included in the center block rows 6 and the second block rows 7 has a hexagonal shape, and each block included in the shoulder block rows 8 has a pentagonal shape.

In the embodiment of FIG. 9, the width BW represents a length between one end and the other end of the block in the tread width direction measured in the tread width direction, and the length BL represents a length between one end and the other end of the block in the tread circumferential direction measured in the tread circumferential direction.

In the embodiment of FIG. 8, the tread ground-contact width is indicated by reference numeral W, and the tread ground-contact length is indicated by reference numeral L.

The tread ground-contact width W and the tread ground-contact length L are measured under the 80% load condition.

In the embodiment, the width BW of each block included in the center block rows 6 is preferably in the range from 15% to 20%, inclusive, of the tread ground-contact width W in the tire width direction TW. The length BL of each block included in the center block rows 6 is preferably in the range from 15% to 35%, inclusive, of the tread ground-contact length L in the tire circumferential direction TC.

Similarly, the width BW of each block included in the second block rows 7 is preferably in the range from 10% to 15%, inclusive, of the tread ground-contact width W in the tire width direction TW. The length BL of each block included in the second block rows 7 is preferably in the range from 15% to 20%, inclusive, of the tread ground-contact length L in the tire circumferential direction TC.

The width BW and the length BL of each block included in the shoulder block rows 8 are not limited to particular ones and may be the same as the width BW and the length BL of each block included in the center block rows 6 or may be the same as the width BW and the length BL of each block included in the second block rows 7.

In the following, a description is given of shearing moduli in the circumferential direction of the blocks arranged on the tread surface. FIG. 10 illustrates the shearing modulus in the circumferential direction of the block 11 of FIG. 9. It should be noted that FIG. 10 illustrates one of the blocks included in the center block rows 6.

As illustrated in FIG. 10, assume cases where the magnitude of deformation of the block 11 in the tire circumferential direction TC is defined as $\Delta x$ when the block 11 has a height d, has an area A in a wall surface of the block 11 that is adjacent to the width direction groove 9, and is applied with a load F.

In such a case, a shearing strain $\gamma$ is represented by $\gamma = \Delta x/d$. A shearing stress $\tau$ is represented by $\tau = W/A$. A shearing modulus G in the circumferential direction is represented by $G = \tau/\gamma$.

Herein, an overall shearing modulus in the circumferential direction of the plurality of blocks as a whole is defined as $G_{ALL}$, and the shearing modulus in the circumferential direction of each block 11 included in the center block rows 6 is defined as $G_C$, the shearing modulus in the circumferential direction of each block included in the second block rows 7 is defined as $G_{2nd}$, and the shearing modulus in the circumferential direction of each block included in the shoulder block rows 7 is defined as $G_{SH}$.

In this case, a ratio $G_C/G_{ALL}$ of $G_C$ to $G_{ALL}$ is in the range from 0.27 to 0.33, inclusive, and a ratio $G_{2nd}/G_{ALL}$ of $G_{2nd}$ to $G_{ALL}$ is in the range from 0.12 to 0.18, inclusive, and a ratio $G_{SH}/G_{ALL}$ of $G_{SH}$ to $G_{ALL}$ is in the range from 0.49 to 0.61, inclusive.

These relations between the ratio $G_C/G_{ALL}$, the ratio $G_{2nd}/G_{ALL}$, and the ratio $G_{SH}/G_{ALL}$ are achieved, for example, by defining the width BW and the length BL of each block included in the center block rows 6, the width BW and the length BL of each block included in the second block rows 7, and the width BL and the length BL of each block included in the shoulder block rows 8 as described above.

According to the above structures, since the ratio $G_C/G_{ALL}$ is 0.27 or more, and each block 11 included in the center block rows 6 has high rigidity, wear resistance of the center block rows 6 is improved. Furthermore, since torsion rigidity of the center block rows 6 is relatively improved, cornering power is improved, which in turn improves steerability. Although the ratio $G_{2nd}/G_{ALL}$ needs to be reduced accordingly, and this need involves the risk of partial wear such as block punch due to accelerated wear in the second block rows 7 subject to self-excited wear, controlling the ratio $G_{2nd}/G_{ALL}$ to be 0.12 or more allows prevention of such partial wear.

Thus, the embodiment improves wear resistance and steerability of the tread portion by optimizing the ranges of the ratio $G_C/G_{ALL}$, the ratio $G_{2nd}/G_{ALL}$, and the ratio $G_{SH}/G_{ALL}$. That is to say, in the embodiment, the ranges of the ratio $G_C/G_{ALL}$, the ratio $G_{2nd}/G_{ALL}$, and the ratio $G_{SH}/G_{ALL}$ are important features that are to be focused and optimized.

In detail, the ratio $G_C/G_{ALL}$ of 0.27 or more reduces the slippage at the trailing time, thereby improving wear resistance. Especially, central wear occurring when the tire is assembled to a drive axle is effectively reduced. Furthermore, since torsion rigidity of the center block rows 6 is relatively improved, inputs in the lateral direction are decreased, and shoulder wear occurring when the tire is assembled to a steering axle is effectively reduced.

Note that the lower limit of the ratio $G_{SH}/G_{ALL}$ herein is determined from the viewpoint of reducing partial wear in the shoulder block rows 8. Note also that the upper limits of the ratio $G_C/G_{ALL}$ and the ratio $G_{SH}/G_{ALL}$ are determined in accordance with balance of the shearing moduli of the blocks in the circumferential direction. An excessively high upper limit of the ratio $G_C/G_{ALL}$ or the ratio $G_{SH}/G_{ALL}$ will result in an excessively small shearing modulus ($G_{2nd}$) in the circumferential direction.

Although the shearing modulus in the circumferential direction has been described with reference to FIG. 10, which is an enlarged view of the block arranged on the tread surface of FIG. 8, it is preferable that a block arranged on the tread surface of FIG. 1 also satisfies the ratio $G_C/G_{ALL}$, the ratio $G_{2nd}/G_{ALL}$, and the ratio $G_{SH}/G_{ALL}$.

Meanwhile, although in the above description the relations of the ratio $G_C/G_{ALL}$, the ratio $G_{2nd}/G_{ALL}$, and the ratio $G_{SH}/G_{ALL}$ are achieved, for example, by defining the width BW and the length BL of each block included in the center block rows 6, the width BW and the length BL of each block included in the second block rows 7, and the width BL and the length BL of each block included in the shoulder block rows 8, the relations of the ratios of the shearing moduli of the blocks in the circumferential direction may also be achieved by defining the width of each block row.

For example, as illustrated in FIG. 8, the plurality of block rows includes the center block rows 6 that are adjacent to the circumferential groove straddling the tire equatorial plane eq in the tread half portion, the second block rows 7 that are adjacent to and located outward in the tread width direction than the center block rows 6, and the shoulder block rows 8 that are adjacent to and located outward in the tread width direction than the second block rows 7 and that include the plurality of blocks defined by the circumferential grooves 4, the width direction grooves 15, and the tread side edges E. In this case, provided that a width CW of each center block row, a width SW of each second block row, and a width SHW of each shoulder block row are each defined as a mean value of the maximum width of the block row measured along the tread width direction and the minimum width of the bock row measured along the tread width direction, the width CW of the center block row, the width SW of the second block row, and the width SHW of the shoulder block row satisfy the following relation CW:SW:SHW=100:(42 to 49):(55 to 65). This allows the shearing moduli of the blocks in the circumferential direction to have the aforementioned relations, and accordingly, wear resistance and steerability of the tread portion are improved.

Additionally, the width CW of the center block row, the width SW of the second block row, and the width SHW of the shoulder block row each specifically refer to a value obtained by adding up the maximum width of a block included in the block row that has the maximum width measured along the tread width direction and the minimum width of a block included in the block row that has the minimum width measured along the tread width direction and by dividing the resulting value by 2.

EXAMPLES

Test 1 is described below.

Figure 5:
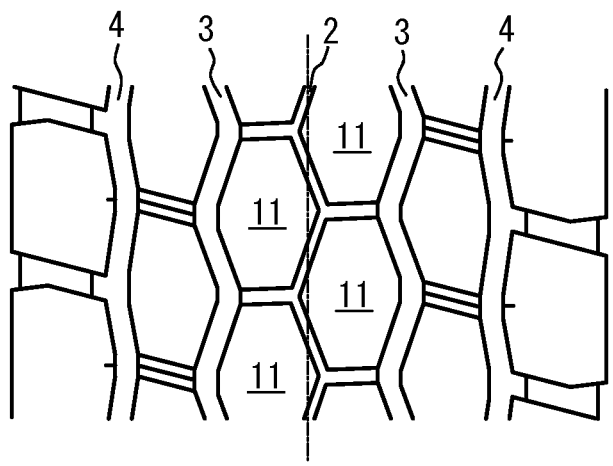
FIG. 5 is a partial development plan view of a tread pattern according to an Example tire.
Figure 6:
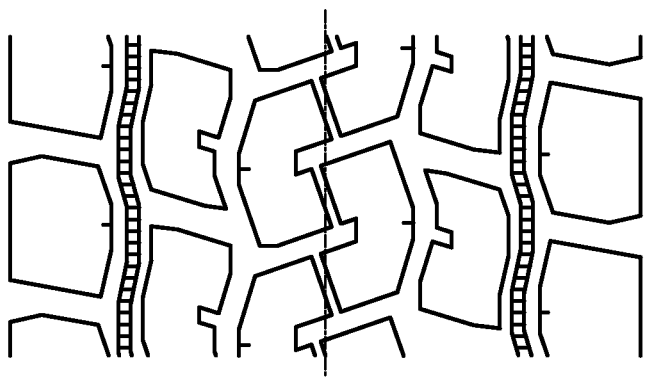
FIG. 6 is a partial development plan view of a tread pattern of a control tire.
Figure 7:
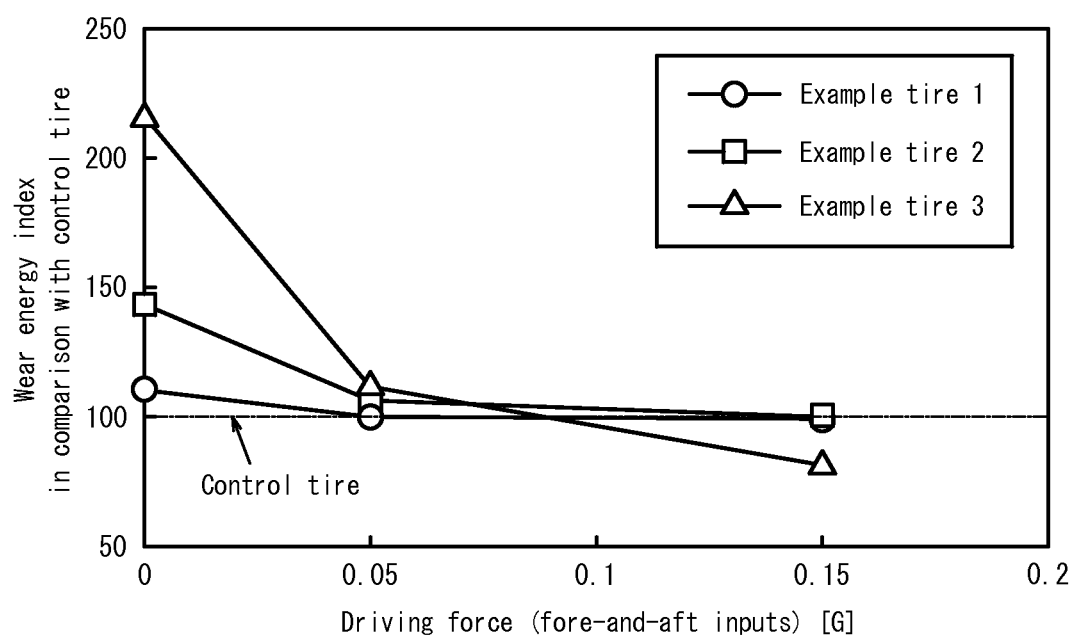
FIG. 7 is a graph of a relation between fore-and-aft inputs (acceleration) and a wear energy index in comparison with a control tire.

The pitch length of each block in the tire with the tread pattern illustrated in FIG. 5 was varied to obtain Example tires 1 to 3 including blocks with pitch lengths of 45.8 mm, 58.4 mm, and 65.8 mm, respectively. The Example tires 1 to 3 were not provided with any sipe and each included the circumferential grooves 3 and 4 having the maximum depth of 16.2 mm. Wear energy indexes were obtained for the tires with respect to the cases where the tires were in free rolling, where fore-and-aft acceleration of 0.05 G was inputted to the tires, and where fore-and-aft acceleration of 0.15 G was inputted to the tires, with the tire including the tread pattern illustrated in FIG. 6 being used as a control. FIG. 7 shows results of the Example tires 1 to 3.

Herein, the maximum depth of the circumferential grooves included in the tread central zone of the control tire was 16.2 mm, and the maximum depth of the circumferential grooves included in the tread side zones of the control tire was 16.7 mm.

Wear energy herein were determined by exerting three levels of driving force to each tire in an indoor tester and by measuring sharing force applied to the tire in the tire circumferential direction and the slippages of the blocks.

As can be seen from FIG. 7, the wear energy index of the Example tire 1 is advantageously low for the low input of 0.05 G, whereas the Example tire 3 with the large pitch length is advantageous for the high input of 0.15 G.

Accordingly, the Example tire 3 with the large pitch length exhibits excellent wear resistance for high inputs.

Assessment results from Test 2 are described below. In detail, samples having the same tread pattern illustrated in FIG. 8 and having different ratios $G_C/G_{ALL}$ ($R_C$), ratios $G_{2nd}/G_{ALL}$ ($R_{2nd}$), and ratios $G_{SH}/G_{ALL}$ ($R_{SH}$) were prepared, and wear (C/L wear) in the center block rows 6, wear (2nd wear) in the second block rows 7, and wear (SHO wear) in the shoulder block rows 8 were measured for each sample. C/L wear, 2nd wear, and SHO wear are indicated by indexes, and a larger index value represents a better result (with less wear).

The following test conditions were adopted.

Tire size: 11R22.5

Rim/wheel size: 7.50×22.5

Tire type: heavy-duty tire

Vehicle: general cargo (under rated load)

Position to which each test tire was assembled: steering axle and drive axle

Traveling distance in final assessment: approximately 100,000 km

Traveled road surface: ordinary road

Table 1 shows the assessment results.

TABLE 1

|  | Example 4 | Example 5 |
|---|---|---|
| $G_{ALL}$ | 155 | 140 |
| $R_c$ | 0.3 | 0.25 |
| $R_{2nd}$ | 0.15 | 0.2 |
| $R_{SH}$ | 0.55 | 0.55 |
| C/L wear | 110 | 95 |
| 2nd wear | 100 | 100 |
| SHO wear | 100 | 100 |

As shown in Table 1, it has been confirmed that, compared with the Example 5 having the ratio $G_C/G_{ALL}$ of less than 0.27, the Example 4 having the ratio $G_C/G_{ALL}$ of 0.27 or more reduces C/L wear while preventing increases in 2nd wear and SHO wear.

Assessment results from Test 3 are described below. In detail, samples each having the tread pattern illustrated in FIG. 8 and having values of the width of the center block row, the width of the second block row, and the width of the shoulder block row shown in Table 2 were prepared, and wear (C/L wear) in the center block rows 6, wear (2nd wear) in the second block rows 7, and wear (SHO wear) in the shoulder block rows 8 were measured for each sample. C/L wear, 2nd wear, and SHO wear are indicated by indexes, and a larger index value represents a better result (with less wear). The same test conditions as those in Test 2 were adopted.

TABLE 2

|  | Example 6 | Example 7 | Example 8 | Example 9 |
|---|---|---|---|---|
| Width CW of center block row | 100 | 100 | 100 | 100 |
| Width SW of second block row | 42 | 49 | 30 | 70 |
| Width SHW of shoulder block row | 59 | 60 | 60 | 60 |
| C/L wear | 114 | 105 | 100 | 80 |
| 2nd wear | 100 | 100 | 80 | 100 |
| SHO wear | 100 | 100 | 100 | 100 |

As shown in Table 2, with the width of each block row falling within the predetermined range, Examples 6 and 7 exhibit improved wear resistance compared with Examples 8 and 9.

Other Embodiments

Although our pneumatic tire has been described based on the above embodiment, the descriptions and the drawings constituting the present disclosure are not to be construed as limiting the pneumatic tire. Various alternative embodiments, examples, and implementation techniques will be apparent to a person skilled in the art from the present disclosure.

In the embodiment, each block included in the center block rows 6 and the second block rows 7 has a hexagonal shape, and each block included in the shoulder block rows 8 has a pentagonal shape in the tread plan view. However, the embodiment is not limited to this example. For example, each block included in the center block rows 6 and the second block rows 7 may have an octagonal shape. Furthermore, in the tread plan view, corners of each block may be chamfered.

The tires according to the embodiment and the modified example thereof have been described with reference to the drawings herein. In the descriptions of the drawings, the same or similar parts are denoted by the same or similar reference numerals. It should be noted that the drawings are schematic and ratios of dimensions and the like are different from actual ones. Therefore, the specific dimensions or the like should be determined in consideration of the descriptions given above. Moreover, as a matter of course, some portions of different figures also have different dimensional relationships and ratios from each other.

REFERENCE SIGNS LIST

1 . . . tread surface
2, 3, 4 . . . circumferential groove
5 . . . tread central zone
6 . . . center block row
7 . . . second block row
8 . . . shoulder block row
9 . . . width direction groove
10 . . . widthwise end portion of block
10a, 11b . . . circumferential middle position
11 . . . block
11a . . . end side
12, 16 . . . sipe
13 . . . notch
14 . . . lateral groove
15 . . . inclined groove
a, a1 . . . circumferential distance
E . . . tread side edge
R . . . radius of curvature
w . . . opening width
L . . . line connecting widthwise end portions
C1, C2 . . . vertex

The invention claimed is:

1. A pneumatic tire comprising a tread surface provided with two or more circumferential grooves each extending to be inclined with respect to a tread circumferential direction and bent in several locations and also extending continuously in the tread circumferential direction, width direction grooves each opening to two circumferential grooves that are adjacent in a tread width direction, and a plurality of block rows including a plurality of blocks defined by the two or more circumferential grooves and the width direction grooves, wherein:

respective blocks included in at least two of the plurality of block rows that are adjacent in the tread width direction with one of the two or more circumferential grooves sandwiched therebetween are arranged to be offset relative to each other in the tread circumferential direction, and the one of the two or more circumferential grooves sandwiched therebetween is smaller in groove width than a width direction groove extending between any two of the respective blocks that are adjacent in the tread circumferential direction, the respective blocks each have a block width that is gradually increased from circumferential end portions of the block to a circumferential middle portion of the block in a manner such that widthwise end portions of the block located on both ends of the block in the tread width direction are positioned in a circumferentially intermediate portion of the block, and the respective blocks each also have a maximum circumferential length that is larger than the maximum width of the block, thereby having, in a plane view thereof, a pentagonal or a higher order polygonal contour shape that includes end sides located in the circumferential end portions, circumferential distances between a circumferential middle position of each of the end sides of the block and a circumferential middle position of a line connecting the widthwise end portions of the block are both twice or more of a maximum depth of the two or more circumferential grooves, a ratio $G_C/G_{ALL}$ is in the range from 0.27 to 0.33, and a ratio $G_{2nd}/G_{ALL}$ is in the range from 0.12 to 0.18, and a ratio $G_{SH}/G_{ALL}$ is in the range from 0.49 to 0.61, where an overall shearing modulus in the circumferential direction of the plurality of blocks as a whole is defined as $G_{ALL}$, and a shearing modulus in the circumferential direction of each block included in center block rows is defined as $G_C$, a shearing modulus in the circumferential direction of each block included in second block rows is defined as $G_{2nd}$, and a shearing modulus in the circumferential direction of each block included in shoulder block rows is defined as $G_{SH}$, each of the respective blocks included in the center block rows is provided with a sipe that extends across the block and that opens to the circumferential grooves at the position of the corresponding pair of widthwise end portions, the sipe including one or more bent portions, the sipe having end positions, each of the end positions formed with a notch that is defined by curved surfaces which are convex to the outer side of the block and that is seamlessly connected to wall surfaces of the sipe, and a depth of the notch formed in the end position of each sipe is smaller in one end position of the sipe that is located closer to a tire equatorial plane than in the other end position of the sipe that is located away from the tire equatorial plane, the two or more circumferential grooves include a center circumferential groove between the center block rows, a pair of intermediate circumferential grooves separating the second block rows from the center block rows and a pair of circumferential grooves formed in outermost sides in the tread width direction separating the shoulder block rows from the second block rows, each of the circumferential grooves is formed in a zigzag shape, amplitudes of the zigzag shape of the circumferential grooves are gradually reduced from the tire equatorial plane to the outer side in the tread width direction, and the amplitude of the zigzag shape of the pair of circumferential grooves formed in the outermost sides in the tread width direction is smaller than that of the center and intermediate circumferential grooves formed in a tread central zone, and each lateral groove formed in the second block rows is provided at the bottom of the groove with a flask sipe having a curved bottom surface.

2. The pneumatic tire according to claim 1, wherein the circumferential distance measured between the circumferential middle position of one of the end sides of the block and the circumferential middle position of the line connecting the widthwise end portions of the block is different from the circumferential distance measured between the circumferential middle position of another one of the end sides of the block and the circumferential middle position of the line connecting the widthwise end portions of the block, and the block has a length between the circumferential middle position of the one of the end sides and the circumferential middle position of the other one of the end sides that is 2.5 or less times the shorter one of the two circumferential distances different from each other.

3. The pneumatic tire according to claim 1, wherein the circumferential distances are both 2.5 or less times the maximum depth of the two or more circumferential grooves.

4. The pneumatic tire of claim 1, wherein each block included in the center block rows and the second block rows has a hexagonal shape, and each block included in the shoulder block rows has a pentagonal shape in the tread plan view.

5. The pneumatic tire of claim 1, wherein:
- the center block rows are provided on the tire equatorial plane,
- the center block rows are provided between the second block rows, and
- the center block rows and the second block rows are provided between the shoulder block rows.

* * * * *